(12) United States Patent
Loewen et al.

(10) Patent No.: US 12,057,674 B2
(45) Date of Patent: Aug. 6, 2024

(54) METHOD AND APPARATUS FOR PRODUCING A HIGH GAIN FREE ELECTRON LASER USING A LARGE ENERGY SPREAD ELECTRON BEAM

(71) Applicant: LYRA ACQUISITION HOLDINGS LLC, New York, NY (US)

(72) Inventors: Roderick J. Loewen, Redwood City, CA (US); Ronald D. Ruth, Stanford, CA (US)

(73) Assignee: Lyra Acquisition Holdings LLC, Wilmington, DE (US)

( * ) Notice: Subject to any disclaimer, the term of this patent is extended or adjusted under 35 U.S.C. 154(b) by 810 days.

(21) Appl. No.: 17/105,178

(22) Filed: Nov. 25, 2020

(65) Prior Publication Data
US 2022/0166180 A1   May 26, 2022

(51) Int. Cl.
H01S 3/09   (2006.01)

(52) U.S. Cl.
CPC .................................. H01S 3/0903 (2013.01)

(58) Field of Classification Search
CPC ... H01S 3/0903; H05H 2007/041; H05H 7/04
See application file for complete search history.

(56) References Cited

U.S. PATENT DOCUMENTS

| 4,449,219 A | 5/1984 | Smith |
| 5,029,172 A | 7/1991 | Edighoffer |
| 5,541,944 A | 7/1996 | Neil |
| 6,137,811 A * | 10/2000 | Sprangle ............... H01S 3/0903 372/74 |
| 2002/0060299 A1* | 5/2002 | Silivra .................... H05G 2/00 250/493.1 |
| 2013/0142207 A1* | 6/2013 | Sankar .................... H01S 3/08 372/26 |
| 2018/0241172 A1* | 8/2018 | Ruth ..................... H01S 3/0903 |
| 2019/0123507 A1 | 4/2019 | Ruth |
| 2020/0295522 A1 | 9/2020 | Whitney |

FOREIGN PATENT DOCUMENTS

| JP | 2003031882 | 1/2003 |
| WO | 2018153516 | 8/2018 |
| WO | WO-2022115139 A1 | 6/2022 |

OTHER PUBLICATIONS

International Preliminary Report on Patentability for International Application No. PCT/US2021/049523, dated Jun. 8, 2023, 8 pages.
International Search Report and Written Opinion of the International Searching Authority for International Application No. PCT/US2021/049523, dated Dec. 7, 2021, 9 pages.

(Continued)

*Primary Examiner* — Xinning(Tom) Niu

(57) ABSTRACT

A system including an electron beam source for providing an electron beam and at least one undulator system configured to produce free-electron laser (FEL) radiation is described. The undulator system includes undulators and at least one optical section between the undulators. The undulators are configured to induce the electron beam to microbunch and radiate coherently. The optical section(s) are configured to operate on the electron beam and the FEL radiation generated by the electron beam.

17 Claims, 13 Drawing Sheets

(56) References Cited

OTHER PUBLICATIONS

Alotaibi et al., Modelling a Laser Plasma Accelerator Driven Free Electron Laser, IOP Publishing, J. Phys. Commun. 3, (2019) 065007, Jun. 24, 2019.

Emma et al., Limitations of Electron Beam Conditioning for Free-Electron Lasers, Proceedings of the 2003 Particle Accelerator Conference, pp. 926-928.

Emma et al., Quadrupole Magnet Error Sensitivities for FODO-Cell and Triplet Lattices in the LCLS Undulator, Feb. 24, 2000.

Huang et al., Review of X-Ray Free-Electron Laser Theory, Physical Review Special Topics—Accelerators and Beams, vol. 10, 034801 (2007), Mar. 12, 2007.

Lee et al., Demonstration of a Ring-FEL as an EUV Lithography Tool, Journal of Synchrotron Radiation, 2020, Received Nov. 26, 2019, Accepted Apr. 22, 2020, pp. 1-6.

Maier et al., Demonstration Scheme for a Laser-Plasma-Driven Free-Electron Laser, Physical Review X, vol. 2, 031019 (2012), Sep. 27, 2012, pp. 031019-1-031019-7.

N.R. Thompson, XFEL Isochronous Chicanes: Feasibility Study, 39th Free Electron Laser Conf., FEL2019, Hamburg, Germany, pp. 658-660.

\* cited by examiner

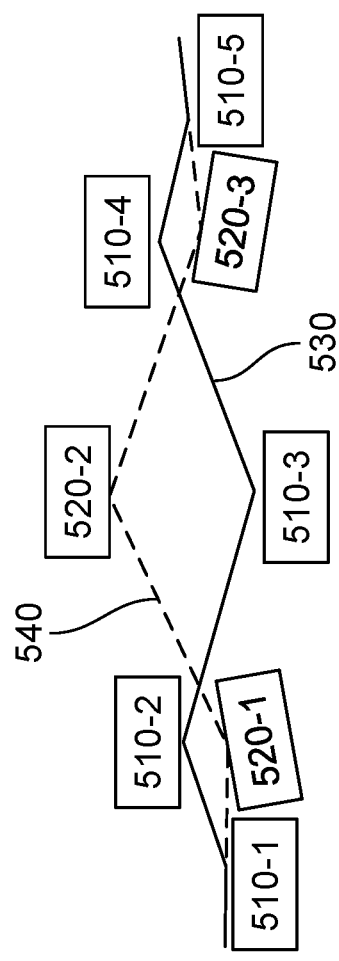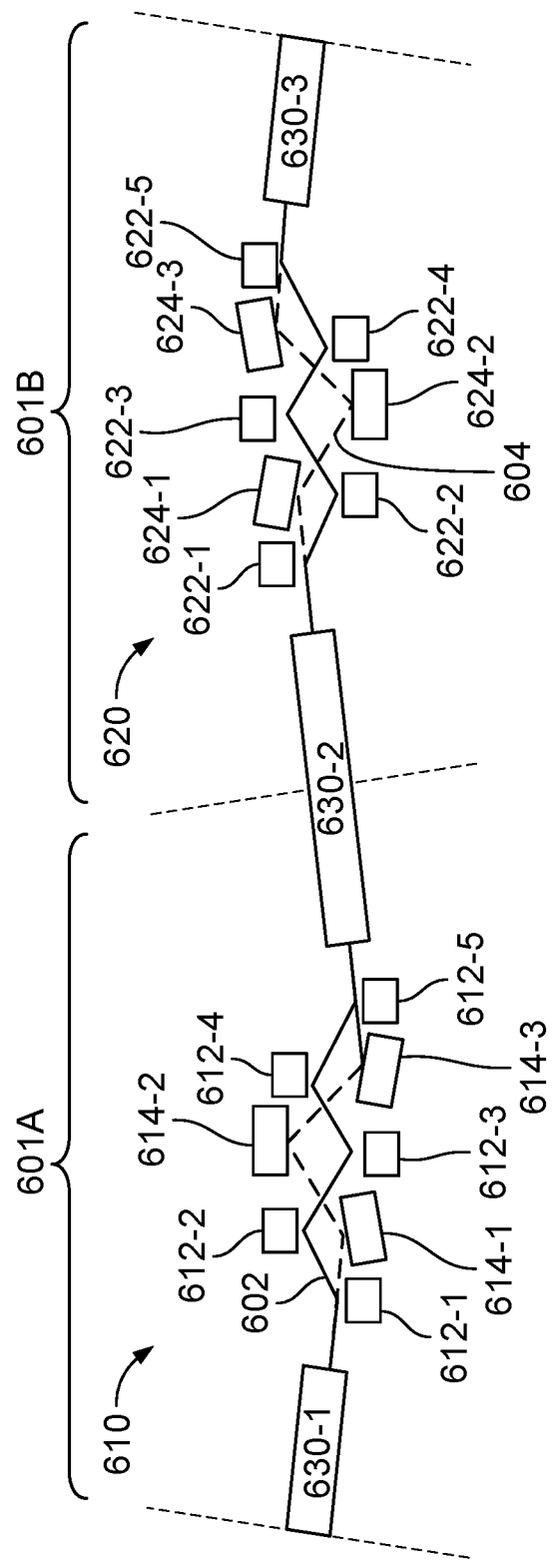

METHOD AND APPARATUS FOR PRODUCING A HIGH GAIN FREE ELECTRON LASER USING A LARGE ENERGY SPREAD ELECTRON BEAM

BACKGROUND OF THE INVENTION

A free electron laser (FEL) emits coherent light by a process where the radiation field in a periodic magnet device, known as an undulator, co-propagates with the electron beam and exchanges energy. In the undulator, there is a phase matching condition in which the co-propagating radiation overtakes the electrons in exactly one undulator period, creating a resonant exchange of energy which density modulates the electron beam at the radiation wavelength, a process also known as microbunching. This microbunched electron beam emits coherent radiation at the expense of the beam kinetic energy, and FEL amplification occurs. For a sufficiently bright electron beam having a sufficiently small energy spread and a sufficiently long undulator (or sequence of undulators), the collective interaction of the beam-radiation system leads to an exponential growth of the radiation intensity along the undulator(s). Such a high-gain FEL can amplify either an input seed signal or the spontaneous undulator radiation produced by electron shot noise. Thus, in the x-ray/EUV wavelength range where both high reflectivity mirrors and coherent input sources are difficult to obtain, intense, quasi-coherent radiation can be generated by using a high gain FEL. The exponential gain eventually stops as the beam loses enough energy to upset the resonant condition, which is called saturation.

One limitation in a working FEL is the energy spread in the electron beam. Radiating electrons do not all have the same longitudinal or transverse energy. In the process of going through an undulator, electrons of differing energies take different paths that degrade the phasing condition and lead to washing out the microbunching while diminishing the emitted radiation. Conventional high gain FEL designs prescribe a limit to the allowable energy spread. Stated differently, conventional FELs have a monochromaticity requirement for the electron energy. Meeting the electron energy monochromaticity requirement is a challenge for electron beams that either already have larger energy spread, such as when the bunch is generated as in laser-plasma-driven sources, or when the equilibrium energy spread grows as power is extracted from the FEL, such as in storage ring sources.

BRIEF DESCRIPTION OF THE DRAWINGS

Various embodiments of the invention are disclosed in the following detailed description and the accompanying drawings.

FIG. 5 indicates the beam paths from an embodiment of a five-element optical section usable in an undulator for an FEL.

FIG. 6 depicts an embodiment of an undulator including five-bend three-mirror optical sections and magnetic undulator sections usable in an FEL.

DETAILED DESCRIPTION

Figure 1:
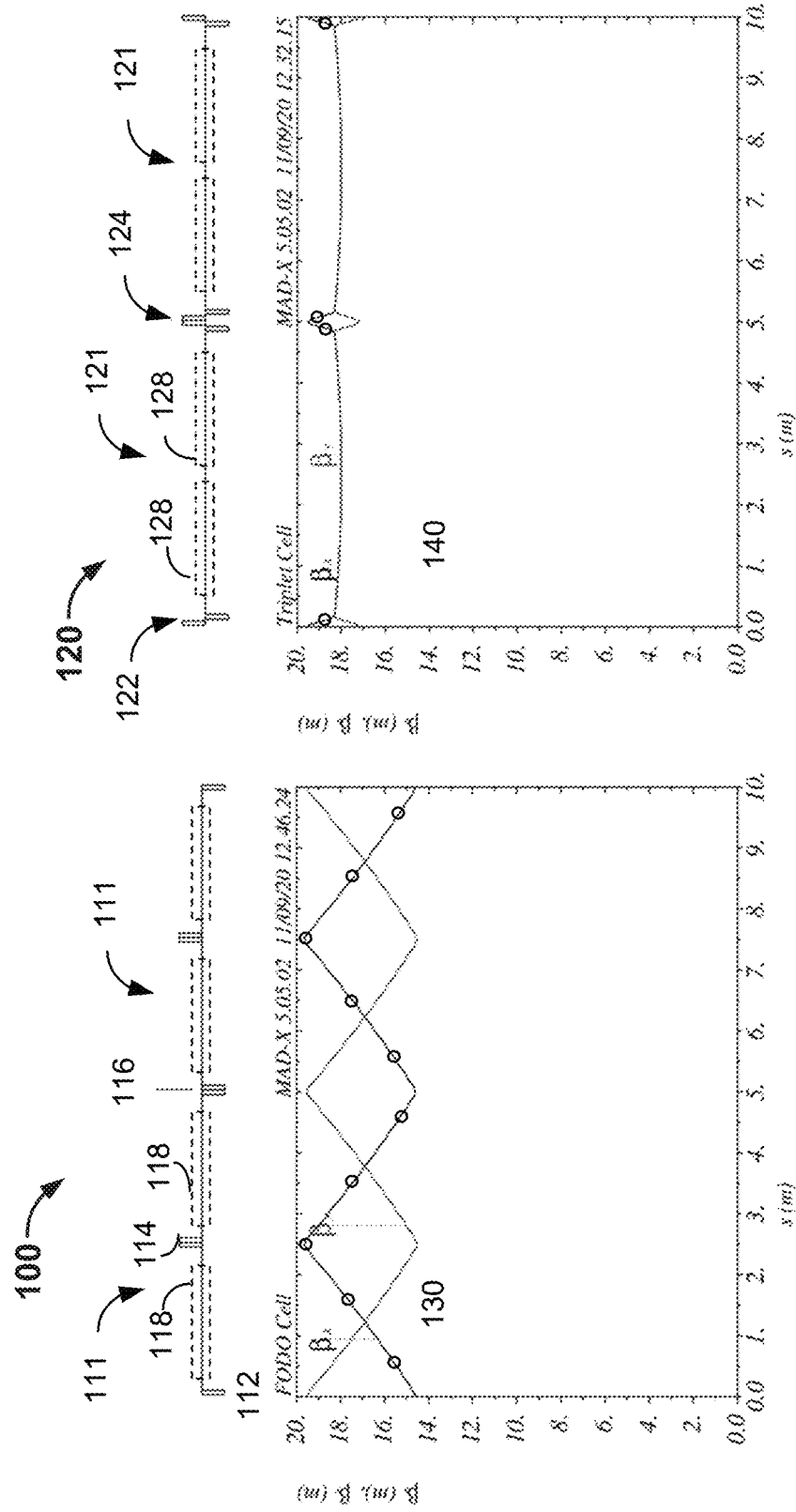
FIG. 1 depicts conventional FEL optical electron beam components interleaved between undulator sections.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A conventional free electron laser (FEL) emits coherent light by using an undulator, which co-propagates the radiation filed with the electron beam and exchanges energy. In the undulator, the co-propagating radiation overtakes the electrons in one undulator period. This creates a resonant exchange of energy, which modulates the density of the electron beam at the radiation wavelength. This process is known as microbunching. This microbunched electron beam emits coherent radiation and FEL amplification occurs. In the x-ray/EUV wavelength range where both high reflectivity mirrors and coherent input sources are difficult to obtain, intense, quasi-coherent radiation can be generated by using a high gain FEL.

Part of the limitation in the gain or output power of a FEL is due to the radiating electrons not all having the same longitudinal or transverse energy. In the process of going through an undulator, electrons of differing energies take different paths that degrade the phasing condition and lead to washing out the microbunching while diminishing the emitted radiation. Conventional high gain FEL designs prescribe a limit to the allowable energy spread, $\sigma_\gamma$, to be smaller than the dimensionless Pierce parameter, $\rho$.

The Pierce parameter is a well-known design metric and is considered to be an important parameter to quantify the FEL process. The parameter $\rho$ is proportional to the laser's gain as well as a measure of the efficiency of transferring stored power in the electron beam to the radiation field. The Pierce parameter is given by:

$$\rho = \frac{1}{16}\left(\frac{I}{I_A}\frac{K^2[JJ]^2}{\gamma_0^3 \sigma_x^2 k_u^2}\right)^{1/3}$$

With I the electron beam current, $I_A \approx 17$ kA the non-relativistic Alfvén current, $\sigma_x$ the mean root mean square (rms) transverse beam size, K the dimensionless undulator strength parameter, the field-coupling defined as $[JJ]=J_0(Y)-J_1(Y)$, $J_0$ and $J_1$ Bessel functions, and $Y=K^2/(4+2K^2)$ for a planar undulator, scales the one-dimensional FEL gain length $L_g=\lambda_u/4\pi\sqrt{3}\rho$, which is the e-folding length of the radiated power.

The Pierce parameter is constrained by physical scaling of magnets and achievable beam parameters, especially for FELs that are designed for short wavelengths. In the EUV/X-ray wavelength range, $\rho \approx 10^{-3}$ is a nearly universal value over a wide range of actual and proposed conventional FEL designs. Meeting the electron energy monochromaticity requirement is a challenge for electron beams that either already have an energy spread on the order of $\rho$ (e.g. if the bunch is generated as in laser-plasma-driven sources) or for FEL designs in which the equilibrium energy spread grows as power is extracted from the FEL (e.g. in storage ring sources). For a storage ring FEL source, the limit to the steady-state coherent power extraction is dependent on the square of the steady-state energy spread in the storage ring. Achieving high gain in a compact FEL undulator system would directly benefit such storage ring FELs, for instance for high average power EUV lithography sources.

Various techniques have been proposed to alleviate the sensitivity of a large electron beam energy spread, but each has limitations. Existing proposals add conditioning of the electron beam distribution to correlate the energy spread with another degree of freedom. In addition, these proposals cannot use conventional undulators, but rather must use more exotic magnet systems.

For example, in one conventional technique, these correlations may couple transverse motion. The Transverse Gradient Undulator (TGU) is a device that allows a correlation of the beam energy spatially which can then be geometrically matched to a commensurately varying undulator strength, K. The TGU creates a local condition for high gain or power in the FEL by using dispersion to separate different energies along different paths. The drawback to such an approach is that the correlation introduces coupled transverse effects that counteract the desired benefit. The main consequence to coupling transverse motion to the longitudinal (energy) degree of freedom is a dilution of the transverse beam quality, or emittance, which is a fundamental effect due to the required use of dispersion. For a storage ring FEL source, a degraded transverse beam quality would limit the extracted power achievable at steady-state, making emittance effects wash out the micro-bunching buildup instead of the energy spread.

A related method correlates energy with time or position along an electron bunch. Preparing the electron beam to have an energy-time dependence, such as an energy chirp, creates slices in time which locally satisfy the FEL criteria for high gain. This approach may allow a larger range of wavelengths to be locally matched along slices of differing mean energy. However, this technique is difficult to implement. While the technique may help for certain linear accelerator FEL sources, it is only suitable over a narrow range of parameters and not applicable to a storage ring implementation.

In contrast, the technique(s) described herein may be used to achieve a high gain FEL, with high output power. In some embodiments, the goals may be achieved with an electron beam with large energy spread, such as $\sigma_\gamma \sim \rho$ (or $\sigma_\gamma > \rho$), in applications where the FEL source works in an energy-spread dominated regime.

A system that includes an electron beam source for providing an electron beam and at least one undulator system configured to produce free-electron laser (FEL) radiation is described. The undulator system includes undulators and at least one optical section between the undulators. In some embodiments, the optical sections are interleaved with the undulators. The undulators may include periodic dipole magnets and are configured to induce the electron beam to microbunch and radiate coherently. The optical section(s) are configured to operate on the electron beam and the FEL radiation generated by the electron beam. The undulator system may also be viewed as including one or more undulator cells. An undulator cell includes an optical section between portions of undulators. The first undulator cell in an undulator system includes a leading complete (i.e. longer) undulator. The last undulator cell in an undulator system includes a trailing complete (i.e. longer) undulator. For example, an undulator system may include a single undulator cell. Such an undulator system has a first (complete) undulator, an optical section and a second (complete) undulator. As another example, an undulator system may include three undulator cells. In such an undulator system, the first undulator cell includes a first (complete) undulator, a first optical section, and a portion of a second undulator. The second undulator cell includes a remaining portion of the second undulator, a second optical section, and a portion of a third undulator. The third undulator cell includes a remaining portion of the third undulator, a third optical section, and a fourth (complete) undulator. Thus, an undulator system including three undulator cells includes four undulators interleaved with three optical sections.

In some embodiments, the optical section(s) are further configured to steer and focus the FEL radiation. For example, the optical section(s) may focus the FEL radiation to phase match the FEL radiation with an electron beam envelope and to modify an FEL radiation path length through the corresponding undulator cell. In some embodiments, the optical section(s) are configured to modify an electron beam density and adjust an electron's path length through the undulator system. Thus, each of the optical sections may include mirror(s) and magnetic bending component(s). The mirror(s) focus the FEL radiation and modify an FEL radiation path length through the optical section. The magnetic bending components focus the electron beam and modify an electron's energy-dependent beam path length through the optical section. In some embodiments, the magnetic bending component(s) deflect the electron beam from location(s) for the mirror(s).

In some embodiments, the system may provide FEL radiation for a large energy spread of the electron beam. For example, an equilibrium relative energy spread of the electron beam is not less than a free election laser p parameter of the system in some embodiments, but the FEL radiation may still be generated. In some embodiments, the undulator cell employs an isochronous optical section for the electron beam. The undulator cell may be configured such that an input electron beam direction for the electron beam entering the undulator cell is within five degrees of an output electron beam direction for the electron beam exiting the undulator cell.

In some embodiments, the system includes an electron storage ring configured for emission of the FEL radiation. The undulator system, including a sequence of undulator cells, is incorporated in the electron storage ring and is configured to produce FEL radiation. In such embodiments, the electron beam source includes an electron injector configured to insert the electron beam into the electron storage ring. The system may also include an exit aperture. Via the exit aperture a portion of the FEL radiation may be output at an extreme ultraviolet wavelength range produced by an interaction of the electron beam through the undulator system.

A system that includes a compact electron storage ring, an electron injector and an undulator system is described. The compact electron storage ring is configured for emission of the FEL radiation. The electron injector is configured to insert an electron beam into the compact electron storage ring. The undulator system is configured to produce FEL radiation and includes undulators and optical section(s) between the undulators. The undulators are configured to induce the electron beam to microbunch and radiate coherently. The optical section(s) operate on the electron beam and the FEL radiation. Further, the optical section(s) include mirror(s) and magnetic bending component(s). The mirror(s) are configured to focus the FEL radiation and modify a FEL radiation path length through the optical section(s). The magnetic bending component(s) are configured to focus the electron beam and modify an electron energy-dependent beam path length through the optical section(s). In some embodiments, the system also includes an exit aperture configured to output a portion of the FEL radiation at an extreme ultraviolet wavelength range produced by an interaction of the electron beam through the undulator.

A method for producing FEL radiation includes injecting an electron beam into a storage system and passing the electron beam through an undulator system in the storage system. The undulator system includes undulators and optical section(s) between the undulators (i.e. one or more undulator cells). An undulator includes multiple undulator magnets. The undulators induce the electron beam to microbunch and radiate coherently. The optical section(s) operate on the electron beam and FEL radiation generated by the electron beam.

In some embodiments, passing the electron beam through the undulator system includes using the optical section(s) to focus the FEL radiation to phase match the FEL radiation with an electron beam envelope and to modify an FEL radiation path length through the undulator. For example, using the optical section(s) may include the optical section(s) that modify an electron beam density and adjust an electron energy-dependent beam path length through the undulator system. Further, passing the electron beam through the undulator system may include directing the electron beam through a path such that the FEL radiation traverses mirror(s) and such that the electron beam traverses magnetic bending component(s). The mirror(s) focus the FEL radiation and modify an FEL radiation path length through the optical section. The magnetic bending component(s) focus the electron beam and modify an electron energy-dependent beam path length through the optical section. Passing the electron beam through the undulator system may include directing the electron beam through undulator cell(s) such that an input electron beam direction for the electron beam entering the undulator cell(s) is within five degrees of an output electron beam direction for the electron beam exiting the undulator cell(s).

In some embodiments, the method operates on an electron beam having an equilibrium relative energy spread that is not less than a free election laser $\rho$ parameter of the electron beam. In some embodiments, each undulator cell in an undulator system is an isochronous undulator cell for the electron beam. In some embodiments, the method includes outputting a portion of the FEL radiation through an exit aperture at an extreme ultraviolet wavelength range produced by an interaction of the electron beam through the undulator.

In some embodiments, therefore, an undulator system including optical and magnetic elements (both in one or more optical sections) interleaved between undulators in an FEL is described. Such an undulator system is used to increase coherent radiation gain and extracted power for electron beams that have a large energy spread, such as when the uncorrelated energy spread is greater than the FEL Pierce parameter $\rho$. By re-focusing the radiation field wavefront to overlap that of a re-focused electron beam, and adjusting the electron energy-dependent path length between undulators, the phase coherence and micro-bunching developed in the FEL can be maintained from one undulator to the next undulator, resulting in a boost to the overall FEL gain and power extraction for electron beams that have larger energy distributions than conventional FEL designs allow.

In some embodiments, the undulator system may be utilized in a storage ring. The electron beam begins with no bunching or structure, but some or all of the bunching that develops in the undulator system can be maintained. In the storage ring between passes of the undulator system, the electron beam radiates and "cools" during circulation to allow the beam to reach a steady-state, uncorrelated energy spread, balanced by the "heating" due to the FEL radiation generated. Thus, a high gain, low Q FEL architecture may be achieved by taking a fraction of the generated power developed in one pass and re-injecting the radiation to seed the next pass. As long as the net gain of the re-injected power is greater than unity, the output power will grow until the net gain reaches exactly unity, which is steady state. Although an FEL achieves higher gain if it has both high peak current and low energy spread, the techniques described herein may aid the energy spread acceptance of the FEL without modification to the peak current such that the peak current requirements are compatible for storage rings.

Thus, an undulator system including an insertion system of optical components (e.g. optical sections) between undulators in a FEL is described. The optical sections include magnet components that act on an electron bunch to simultaneously provide focusing in one or both transverse planes, a nearly (tunable) isochronous path, and a geometry that allows optical mirrors to be placed within this system. The optical mirrors intercept the co-propagating FEL radiation from the upstream undulator to steer, focus, and adjust the radiation path length to control the overlap of the exiting radiation field to that of the exiting electron bunch in order to sustain or modify the FEL interaction in the downstream undulator. Further, passive optics may be used in the optical sections to improve the overlap of the radiation field to that of the electron beam's path and transverse envelope (focusing).

In some embodiments, the arrangement of optical components in the insertion system creates either a small deflection to an otherwise linear path of the electron beam or radiation field, or alternating deflections that considerably cancel when including a sequence of one or more insertion systems (optical sections) and undulators (i.e. undulator cells) for the FEL system.

In some embodiments, the undulator system may be implemented in conjunction with an electron storage ring. Thus, the undulator system may utilize a non-zero electron beam dispersion function that is consistent with a periodic dispersion, or closed orbit solution (e.g. a periodic electron circulation system), such as an electron storage ring. Further, the undulator system may be made compact in terms of the size and/or number of optical elements. For the electron beam, magnetic elements can be combined-function magnets which do both bending and focusing.

FIG. 1 depicts conventional FEL optical electron beam components interleaved between undulators for systems 100 and 120. System 100 shows two cells 111. Each cell 111 includes a set of elements consisting of alternating quadrupole focusing magnets 112, 114, and 116 in which gaps would contain undulator magnets 118. The periodic cell 111 is known as a FODO cell and would be repeatable over a sequence, shown here in system 100 with two cells. The electron beam optical (beta) functions for the two transverse planes are shown in the corresponding plot 130. Large beta functions (>10) provide collimated beam sizes of the electron beam in the gaps where the undulators are placed. An alternate focusing scheme using a Triplet combination of focusing and defocusing quadrupoles is shown in system 120. System 120 includes two cells 121. With groups of magnet combinations 122 and 124 both planes can be collimated over a long distance, shown here with two undulators 128 in the gap. The electron beam optical (beta) functions for the transverse planes are equal through the drifts 140. There are two main features of either system 100 and 120. First, although either configuration could provide stronger focusing to allow smaller, denser electron beams and increase the FEL gain locally, the generated radiation field would also follow the electron beam size, continuing to grow at the exit of the undulator and reduce the field overlap which would in turn substantially decrease the FEL gain in subsequent undulator sections. Secondly, these types of insertion optics, whether FODO or Triplet focusing, cannot create isochronous conditions for the electron beam path.

In contrast, the embodiments described herein include one or more optical sections. Each optical section includes a sequence of optical elements. Optical sections are placed between undulators. As used herein, an embodiment of an "undulator cell" includes an optical section between portions of undulators. The undulator cell may be in an FEL. The optical sections act on both the electron beam properties as well as the radiation properties induced by the FEL. The optical sections increase the gain and power of the FEL radiation for electron bunches that have a large energy spread, in particular for an energy spread greater than the FEL Pierce parameter, $\rho$.

Using the techniques described herein several conditions can be simultaneously fulfilled in some embodiments. The conditions include: transversely focusing both an electron beam and the corresponding radiation field within an undulator to increase the beam density and overlap during the FEL process; adjusting the electron beam energy-dependent path length to create a near isochronous condition for the electron beam between undulators; adjusting the overall path length of either or both the electron beam and radiation field to provide temporal overlap between them when entering the next undulator.

In the conventional FEL process, there is a slippage in time of the electron trajectory to that of the radiation field as the electrons travel along a conventional undulator, or sequence of conventional undulators. As this slippage grows over the length of the conventional FEL, it adversely affects the ability to maintain microbunching for electron distributions with large energy spread. By restoring or adjusting the path length dependence on energy between undulators using the techniques described herein, the microbunching occurring within the electron distribution can be better preserved, allowing subsequent undulators to continue the FEL process with high gain. The high gain may be more pronounced when combined with transverse focusing in both the electron beam and the FEL-induced radiation beam provided that the co-propagating radiation fields continue to overlap the electron trajectory and temporal position.

The sequence of elements is described in the context of various embodiments having differing physical layouts. However, the embodiments may share a set of common design characteristics such as: transverse focusing of the electron beam; an isochronous but tunable path for the electron beam; and mirror elements. In some embodiments, transverse focusing of the electron beam at the exit of the optical section into a drift space suitable for placement of an undulator is performed. Desired focus strengths have beta functions (e.g. in meters, proportional to depth of focus) about the same value as the undulator magnet length. For the isochronous electron beam path, the path length dependence due to the particle energy through a system of magnets is characterized by an element called $R_{56}$. When $R_{56}=0$, the optical system is isochronous. The $R_{56}$ is defined as the integral of the dispersion over the bend radius, $$R_{56} = \int \frac{\eta(s)}{\rho(s)} ds$$

$R_{56}$ can be minimized by balancing the signs of the combination of the dispersion and bend angles over a sequence of magnets. The $R_{56}$ may be either sign, negative or positive, and tuned about zero by small adjustments to either bending angles or dispersion. The mirror elements are configured for bending, focusing, and adjusting the path length of the FEL radiation beam coming from an undulator upstream of the optical section and redirecting it downstream on a path substantially overlapping the exiting electron trajectory. Thus, various embodiments described herein may satisfy the above conditions and may have the characteristics described herein.

Figure 2:
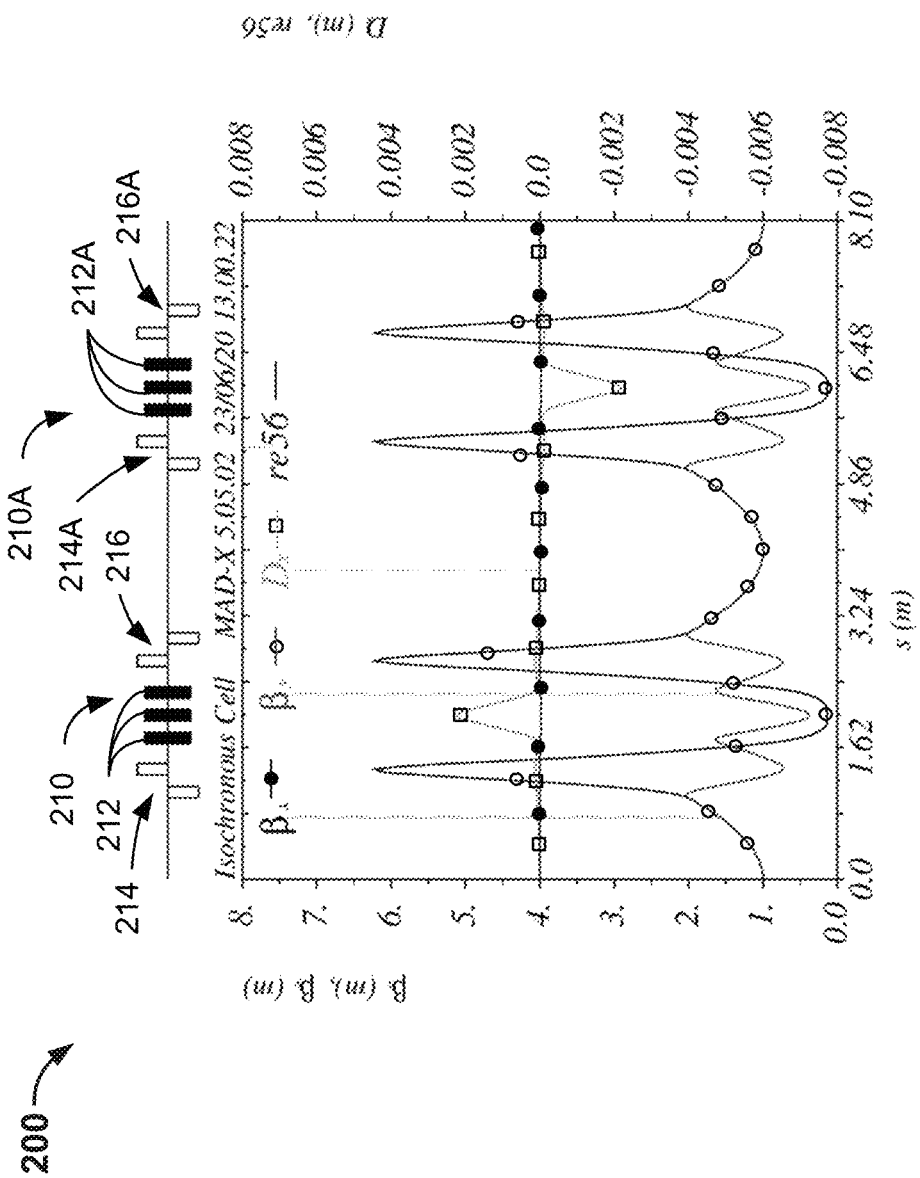
FIG. 2 depicts an embodiment of an optical section usable in an undulator for a FEL.

FIG. 2 depicts an embodiment of system 200 including optical sections usable in an undulator system for an FEL. System 200 is a locally corrected isochronous, achromatic optical "double-cell". System 200 thus includes two optical cells 210 and 210A (i.e. two optical sections, each of which would be between undulators), each containing three combined function bends that have both dipole and quadrupole magnetic fields due to components 214, 212 and 216 and components 214A, 212A and 216A, respectively. The relative strengths are adjusted to meet the isochronous condition. For transverse focusing, pairs of quadrupoles 214 and 216 and 214A and 216A flank the bending magnets. The bending angles in the center dipoles 212 and 212A (solid three elements) are reversed from one optical cell 210 to the next 210A. Each optical cell 210 and 210A is achromatic (i.e. starting and ending transverse position may be independent of energy, dispersion $D_x=0$ or periodic in some embodiments) and isochronous (i.e. path times of different energy particles are the same). Each optical cell 210 and 210A contains a pair of quadrupole doublets (214 and 216 and 214A and 216A, respectively) to add focusing independent of the three combined function dipoles (212 and 212A, respectively), which are used to satisfy the isochronous condition locally. In this example, both optical cells 210 and 210A have matched transverse beta functions ($\beta_x$, $\beta_y$) of 1.0 m, as well as zero dispersion, $\eta$ (or $D_x$), and its derivative, $\eta'$, in the middle of the gaps between the cells. The gap (e.g. in the space between components 216 and 214A) is a drift space that can accommodate an undulator insertion. Thus, an undulator system including system 200 may also include undulators before optical cell 210, between optical cells 210 and 210A, and after optical cell 210A.

Figure 3:
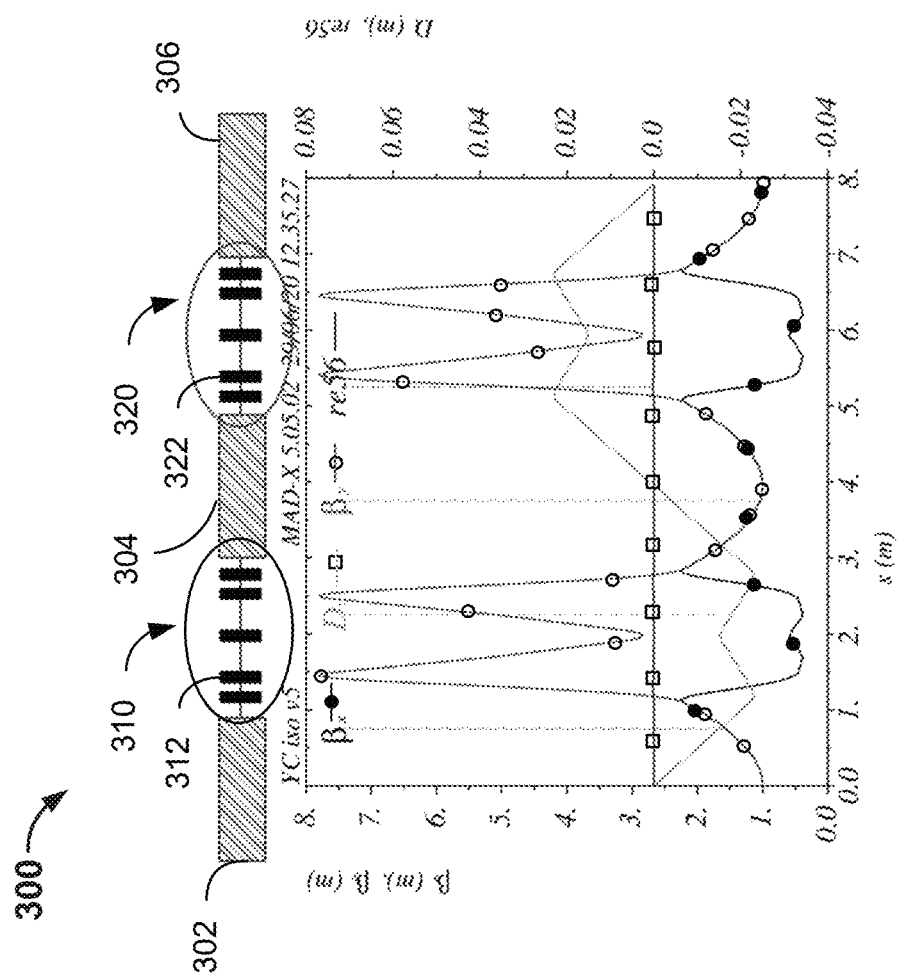
FIG. 3 depicts an embodiment of an undulator including five-element optical sections usable in a FEL.

FIG. 3 depicts an embodiment of an undulator system 300 including five-element optical sections 310 and 320 usable in a FEL. Each optical section 310 and 320 is part of a five-element isochronous optical double-cell in which the bending angles of all five combined function dipoles 312 and 322, respectively (only one of which is labeled in each optical section) are reversed from one optical section 310 to the next optical section 320. Each optical section 310 and 320 simultaneously creates an isochronous condition as well as transverse focusing. In this example, both optical sections 310 and 320 have matched transverse beta functions ($\beta_x$, $\beta_y$) of 1.0 m, as well as zero dispersion, $\eta$ (or $D_x$) in the middle of the gaps between the optical sections, but allows a linear slope within the gap between groups of magnets defined by its derivative $\eta'$. Optical sections 310 and 320 are isochronous but provide some manipulation of the dispersion function over the drift space (e.g. locations of undulators 302, 304 and 306 that provide microbunching) of undulator system 300. In this case, a periodic double-cell solution has zero dispersion at the midpoint between optical cells, midway between 310 and 320. The optical elements within each optical insertion 310 and 320 are five combined function bends. There is internal mirror symmetry within the five-element configuration to match the input and output focusing conditions, while the anti-symmetric dispersion is arranged by reversing the bend angles of all five elements 312 and 322 in subsequent optical cells.

Figure 4:
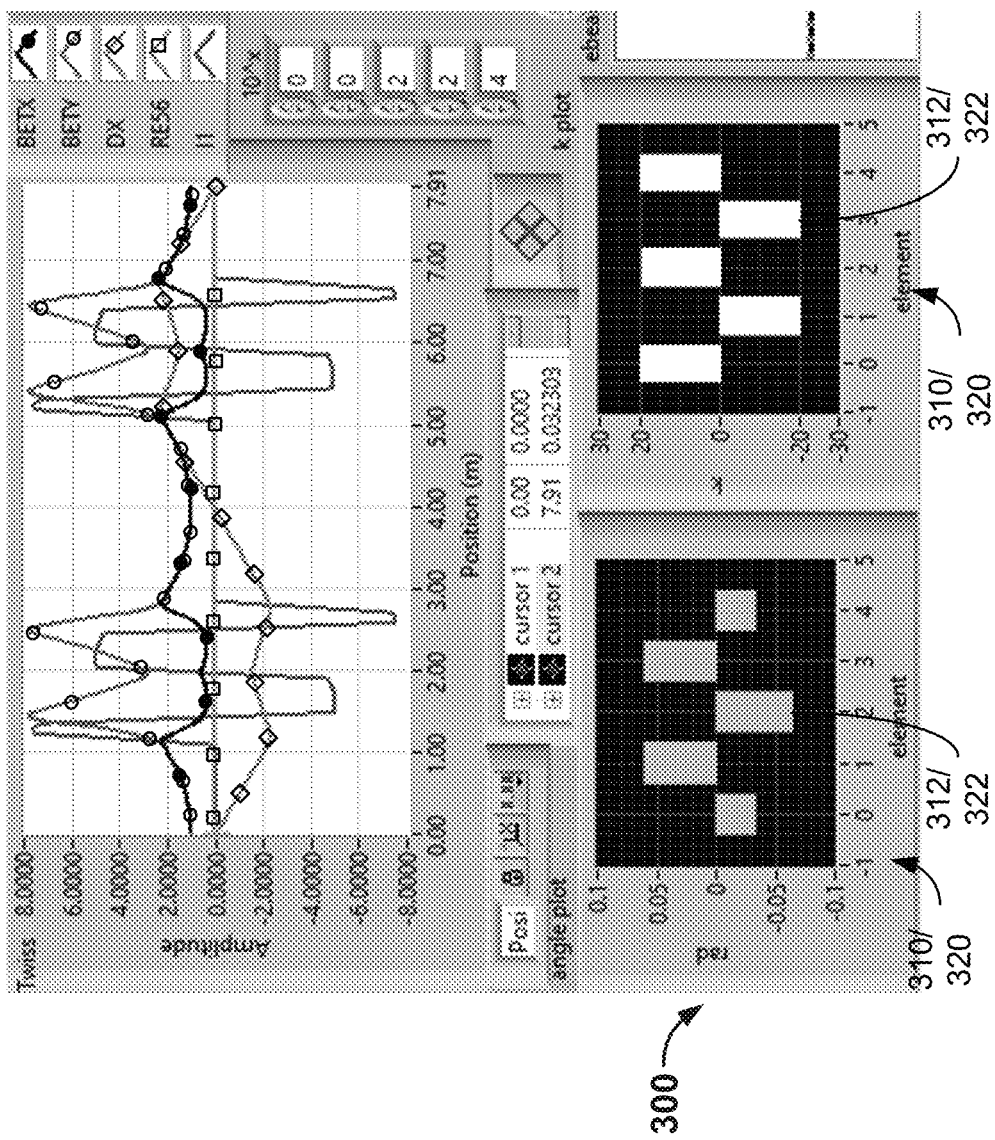
FIG. 4 depicts an embodiment of five-element optical sections in an undulator usable in a FEL with the explicit R56.

FIG. 4 depicts an embodiment of five-element optical sections 310 and 320 of undulator system 300 usable in an FEL with the R56 calculation plotted. The added calculation of the explicit R56 shown as I1. The bending angles (rad) of the five combined function magnets 312/322 in one optical cell 310/320 are shown in the lower left, and the corresponding focusing strengths (k) are shown in the lower right.

FIG. 5 indicates the beam paths from an embodiment of a five-element optical section 500 usable in an undulator for an FEL. Optical section 500 may be used in one or both of optical section(s) 310 and/or 320. Optical section 500 includes five bending components 510-1, 510-2, 510-3, 510-4 and 510-4 (collectively or generically 510) that operate on the electron beam 530. Bending (e.g. magnetic) components 510 may provide both focusing and bending of electron beam 530. Also shown is radiation beam 540 and mirrors 520-1, 520-2 and 520-3 (collectively or generically 520). Thus, optical section 500 includes multiple components 510 that operate on electron beam 530 interleaved with an example 3-mirror 520 radiation beam optical system that operates on radiation beam 540. Angles are exaggerated for illustration purposes. For example, in some embodiments, the angles are on the order of less than five degrees (e.g. less than ninety mrads). The net bending angle through section 500 is also small, for example on the order of one degree or less. The electron beam path 530 (solid line) is shown as line segments, although the actual path is a series of arcs and straights. The three mirror elements 520 redirect the radiation beam path 540 and provide a tunable path length to adjust the timing of the radiation field 540 to that of the electron bunch 510. Mirror elements 520 may be planar or curved to provide focusing or defocusing in one or both transverse planes. Electron beam 530 and radiation beam 540 may be adjusted in system 500 to have the same overall path length through system 500 (e.g. through a cell 310 or 320). In some embodiments, system 500 is configured such that the input direction of electron beam 530 entering the undulator cell employing system 500 may be within five degrees of the output direction of electron beam 530 exiting the undulator cell 500.

FIG. 6 depicts an embodiment of undulator system 600 including five-bend three-mirror optical sections 610 and 620 as well as undulator magnets 630-1, 630-2, and 630-3 (collectively or generically 630) usable in an FEL. Undulator system 600 can also be viewed as including two undulator cells 601A and 601B. Undulators 630 of undulator system 600 are between optical sections 610 and 620. Undulators 630 may provide microbunching of the electron beam and may include periodic dipole magnets. In another embodiment, another number of optical sections and/or undulators may be used. Also shown are the path of electron beam 602 and the path of the emitted radiation 604 (a dashed line). The optical functions have periodic symmetry, marked by the dotted lines at the centers of the drift lengths (or undulators 630 as illustrated). By alternating the sign of all bend angles from one cell 610 to the next cell 620, the deflection angles for a series of cells substantially cancel. Thus, the input direction to undulator system 600 for electron beam 602 is substantially parallel to the output direction for electron beam 602 exiting undulator system 600. This geometry may be useful for a periodic insertion of multiple cells into a straight section, such as one leg in a racetrack storage ring. Alternatively, keeping the same sign of bend angles in each cell creates an arc sequence with an overall net bending angle equal to the aggregate sum of each cell.

Figure 7:
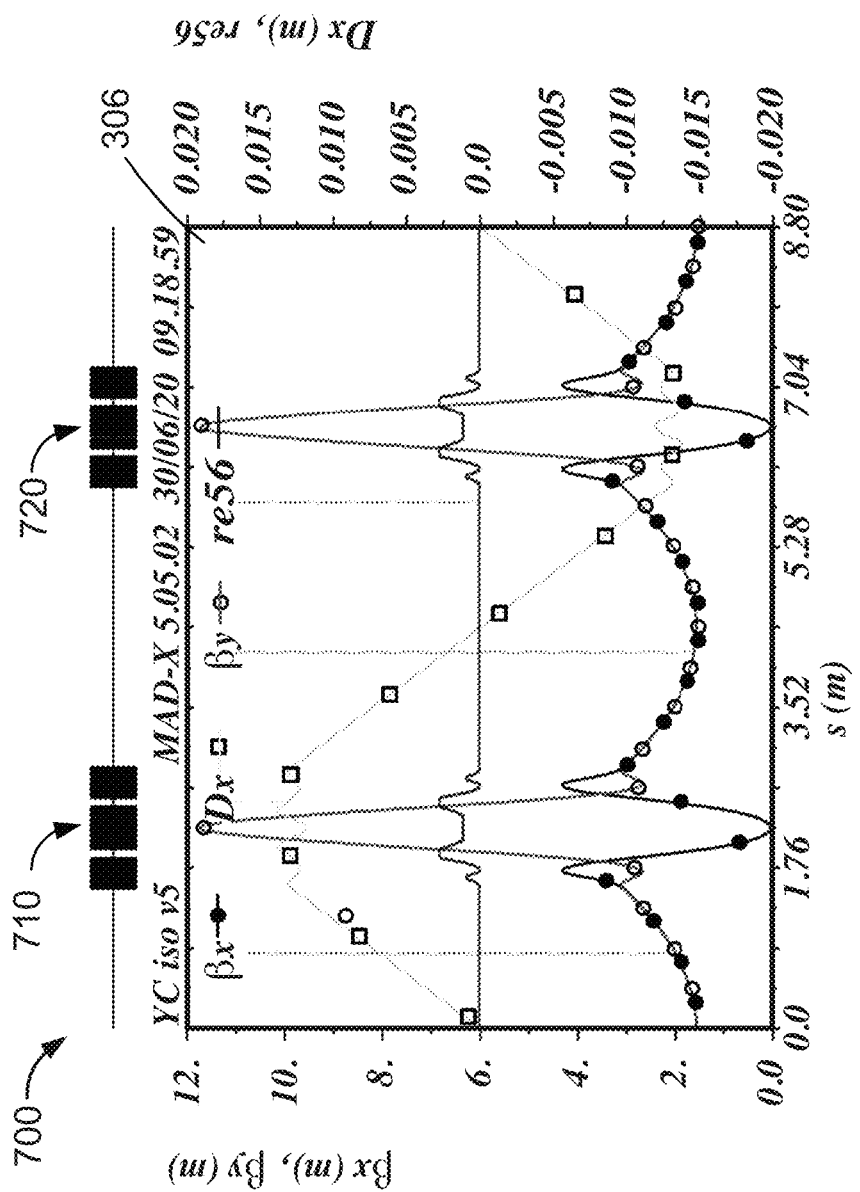
FIG. 7 depicts an embodiment of seven-element optical sections usable in an undulator for a FEL.
Figure 8:
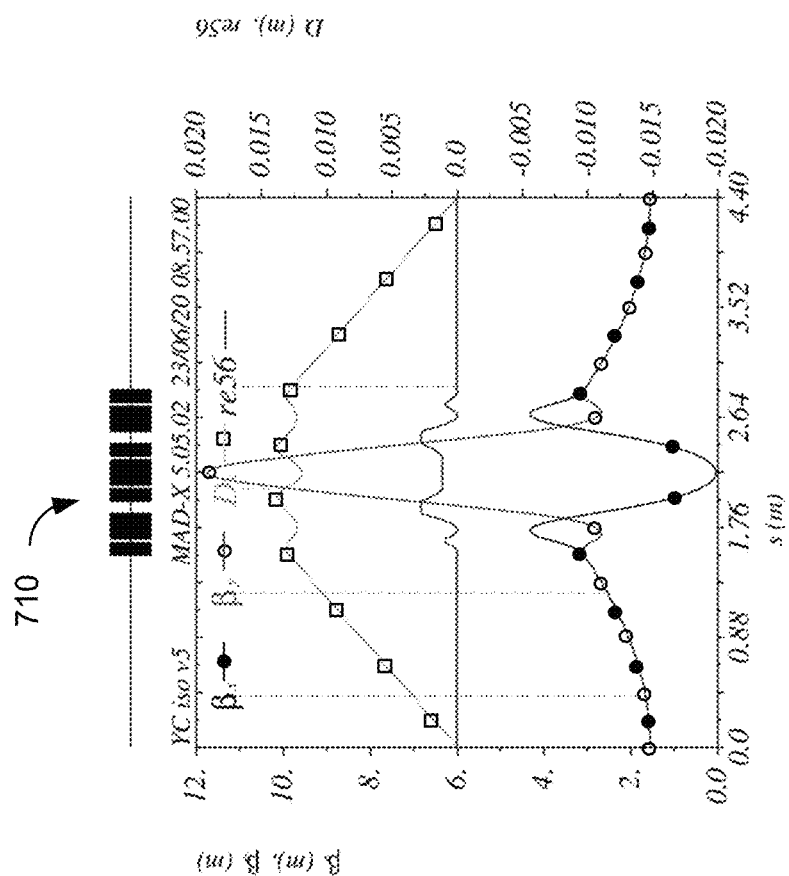
FIG. 8 depicts an embodiment of a seven-element optical section usable in an undulator for a FEL.

FIG. 7 depicts an embodiment of an undulator system 700 including two seven-element optical sections 710 and 720 usable in an undulator for an FEL. If used in an undulator system, undulators (not shown in FIG. 7) may reside before optical section 710, between optical sections 710 and 720, and after optical section 720. Each optical cell 710 and 720 is a seven-element isochronous and optical double-cell in which the bending angles of all seven combined function dipoles are reversed from one optical cell 710 to the next optical cell 720. (FIG. 8 includes an expanded view of the elements.) Each optical cell 710 and 720 simultaneously creates an isochronous condition as well as transverse focusing. In this embodiment, both optical cells 710 and 720 have matched transverse beta functions ($\beta_x$, $\beta_y$) of ~1.7 m, as well as zero dispersion, $\eta$ (or $D_x$), in the middle of the gaps between the optical cells, but allows a linear slope within the gap between groups of magnets defined by its derivative $\eta'$. Each cell 710 and 720 implement the seven bends in a compact geometry. A compact sequence of magnets allows a large gap for the undulator magnets of the undulator system. There is internal mirror symmetry within the seven-element configuration to match the input and output focusing conditions, while the anti-symmetric dispersion is arranged by reversing the bend angles of all seven elements in subsequent cells (e.g. cell 720 reverses the bend angles of cell 710). The function is similar to the five-element embodiment, but the gap or drift length within the optical cells is increased when compared to the length of the optical system components. This feature is desirable if the total length of the FEL is desired to be short, for instance when implemented in an electron storage ring. The compact layout of one cell 710 is illustrated more clearly in FIG. 8. The sequence of elements in cell 710 represents short lengths of combined function bends in a compact geometry to minimize the overall length of the electron beam optical manipulation between gaps or drifts that accommodate FEL undulator magnets. In this case, the focusing strengths (k) of the magnets are adjusted by changing the length of the elements in order to remain realizable with conventional technology or practical economically. Further, the seven elements for cell 710 (as well as cell 720, not depicted in FIG. 8) are shown.

Figure 9:
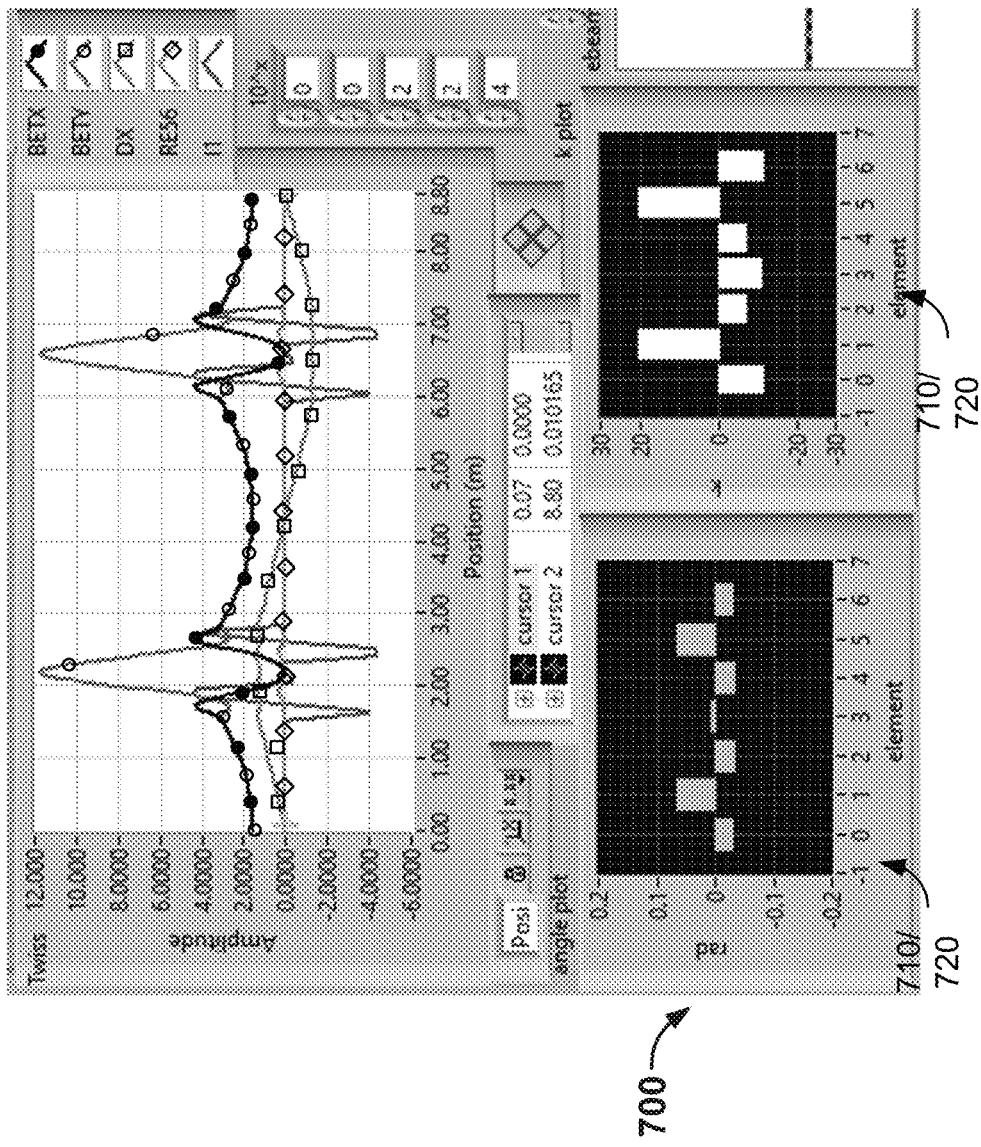
FIG. 9 depicts an embodiment of a cell for seven-element optical sections usable in an undulator for a FEL with the explicit R56.

FIG. 9 depicts a seven-element optical section 710 or 720 usable in an undulator system for an FEL with the explicit R56 calculation plotted. The seven-element isochronous and optical double-cell depicted in FIG. 9 is analogous to that described in FIGS. 7 and 8, but with the added calculation of the explicit R56 shown as I1. The bending angles (rad) of the seven combined function magnets in cell 710 or 720 are shown in the lower left, and the corresponding focusing strengths (k) are shown in the lower right.

Figure 10:
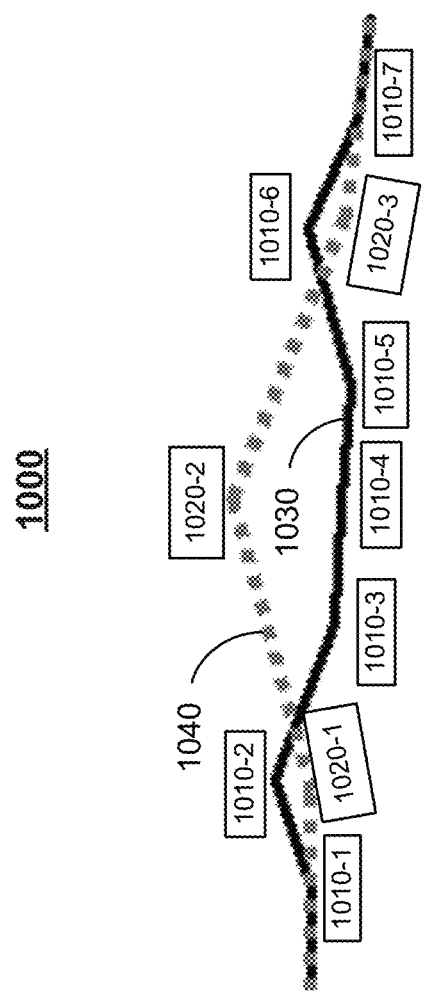
FIG. 10 indicates the beam paths from an embodiment of a seven element optical section usable in an undulator for an FEL.

FIG. 10 indicates the beam paths from an embodiment of a seven-element optical section 1000 usable in an undulator system for an FEL. Section 1000 is analogous to sections 710 and 720 depicted in FIGS. 7-9. System 1000 indicates the electron beam optical system of FIGS. 7-9 including magnetic bending components 1010-1, 1010-2, 1010-3, 1010-4, 1010-5, 1010-6, and 1010-7 (collectively or generically 1010) and radiation components (e.g. mirrors) 1020-1, 1020-2, and 1020-3 (collectively or generically 1020). Angles are exaggerated for illustration purposes. The electron beam path 1030 is shown as line segments, although the actual path is a series of arcs and straight segments. The three mirror elements 1020 re-direct the radiation beam path 1040 (dotted line) while also providing a tunable path length to adjust the timing of the radiation field to that of the electron bunch. The mirror elements 1020 may be planar or curved to provide focusing or defocusing in one or both transverse planes. The alternating bends due to magnetic components 1010 within one cell 1000 provides space to insert mirrors 1020. In this case the seven bends have gaps in which to place mirrors. The position of the central mirror 1020-2 is adjusted to match the path length of the radiation to be near the path length taken by the electron beam 1040. Other geometries that satisfy the ability to tune the radiation path length are also acceptable. Both electron and radiation trajectories are adjusted to be co-propagating, or with a small offset or angle if desired. For example, the input direction of electron beam 1030 entering an undulator system including system 1000 may be within five degrees of the output direction of electron beam 1030 exiting the undulator system.

Using system(s) 200, 300, 500, 600, 700 and/or 1000, an electron beam and the corresponding radiation field (or beam) may be transversely focused within an adjacent undulator magnet. Thus, system(s) 200, 300, 500, 600, 700, and/or 1000 may be used to increase the beam density and overlap during the FEL process. Further, systems 200, 300, 500, 600, 700 and/or 1000 can modify the electron beam energy-dependent path length to create a near isochronous condition for the electron beam between undulator magnets. Similarly, system(s) 200, 300, 500, 600, 700 and/or 1000 may adjust the overall path length of either or both the electron beam and radiation field to provide temporal overlap between them when entering the next undulator section. Consequently, system(s) 200, 300, 500, 600, 700 and/or 1000 may be used in the context of an FEL to provide FEL radiation for a large energy spread of the electron beam. For example, an equilibrium relative energy spread of the electron beam may be not less than a FEL Pierce parameter (e.g. on the order of the Pierce parameter or larger), but the FEL radiation may still be generated using system(s) systems 200, 300, 500, 600, 700 and/or 1000. In some embodiments, the undulator system is an isochronous undulator system for the electron beam. The undulator system, or cell within the system, may be configured such that an input electron beam direction for the electron beam entering the undulator system, or cell within the system, is within five degrees of an output electron beam direction for the electron beam exiting the undulator system, or cell within the system.

Figure 11:
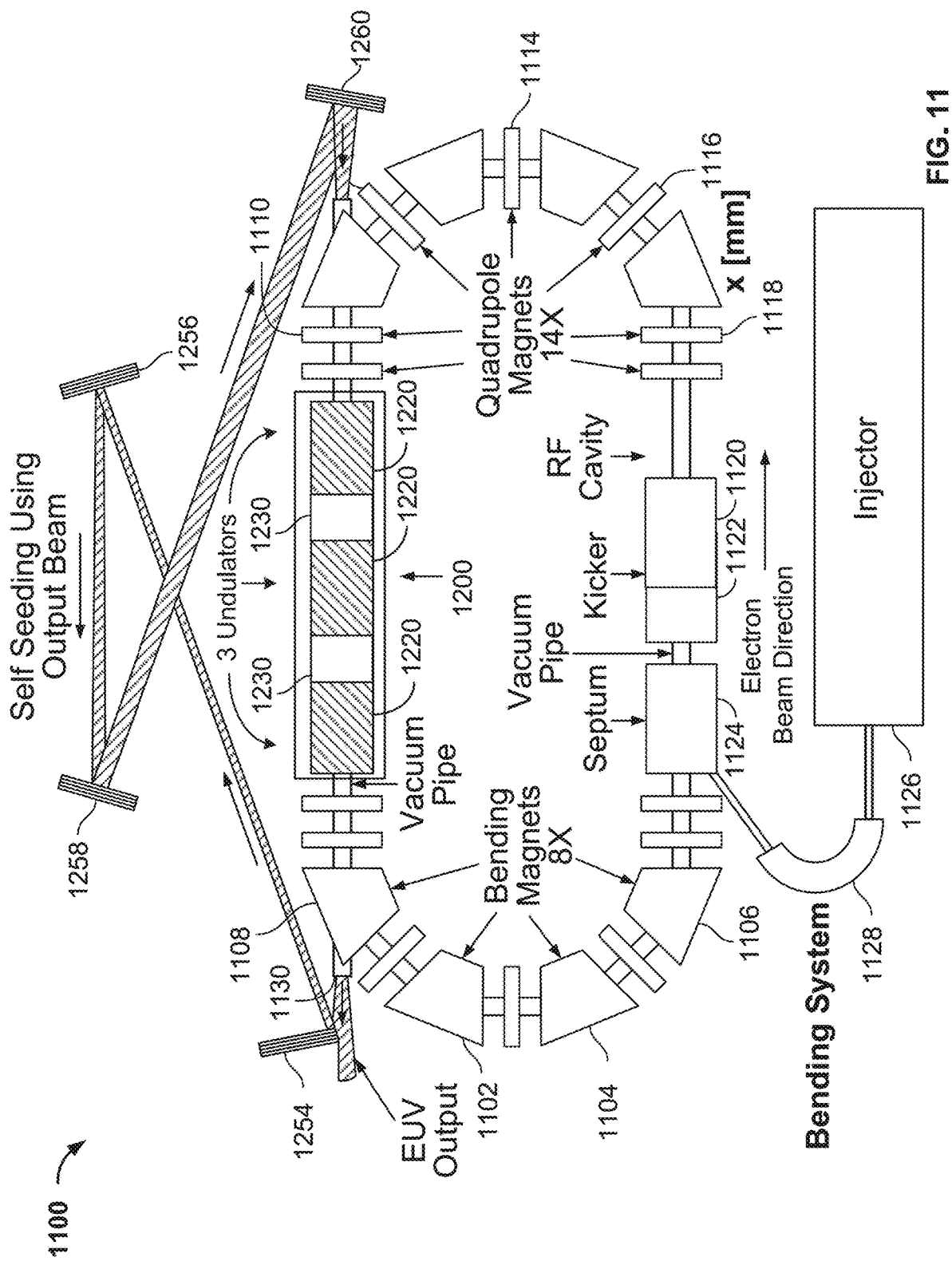
FIG. 11 depicts an embodiment of an FEL including an undulator having optical sections and magnetic undulator sections.

FIG. 11 depicts an embodiment of an FEL employing an undulator system using optical and undulator magnet sections such as system(s) 200, 300, 500, 600, 700 and/or 1000. In other embodiments, the FEL may be differently configured. FIG. 11 includes electron storage ring 1100 having undulator system 1200 having optical sections 1230 and undulator magnets 1220. In some embodiments, electron storage ring 1100 is a compact storage ring having a circumference that is on the order of 60 meters. For example, electron storage ring 1100 may fit inside a 200 square meter area. In some embodiments, electron storage ring 1100 has a circumference that is at least 60 meters but less than 100 meters. However, other sizes are possible. In some embodiments, the energy of electron storage ring 1100 is more than 500 MeV but equal to or less than 1 GeV. The shown storage ring 1100 includes undulator 1200 system, bending magnets 1102, 1104, 1106, and 1108, quadrupole magnets 1110, 1112, 1114, 1116, and 1118 for beam focusing, and an RF Cavity 1120 for replacing energy lost by synchrotron radiation and also to keep the electrons in tight bunches longitudinally. Not all components have been labeled and only a select number of the components have been labeled to illustrate the embodiment clearly. Injector 1126 generates electron beams that are bent by bending system 1128 (e.g., using one or more magnets) for insertion in the storage ring. Septum 1124 receives the electron beam and pulsed kicker magnet (kicker) 1122 is used to inject the electron beam into the storage ring. In various embodiments, the use of pulsed kicker magnet 1122 is optional.

Injector 1126 provides sufficient energy to the electron beam to be injected and stored in the storage ring. Thus injector 1126 may be considered a source of an electron beam in the embodiment shown. The final energy of the injector may be either the design energy or a lower energy which is subsequently increased after storage in the storage ring. The injector may be one of several different types that are familiar to those skilled in the art. In some embodiments, injector 1126 includes a linear accelerator (LINAC). In some embodiments, injector 1126 includes a LINAC utilized on multiple passes by bending the beam to pass through the LINAC more than once. In some embodiments, injector 1126 includes a Microtron. In some embodiments, injector 1126 contains a Synchrotron Booster Ring. The emittance of the injected beam is not required to be a very low emittance. The injected emittance is sufficiently low so that the beam may circulate enough times in the electron storage ring to come to equilibrium after cooling to the smaller equilibrium emittance sufficient for FEL emission. The injected energy spread does not have to be as low as that in the storage ring which is required for FEL emission. However, the injected energy spread is sufficient to permit the electron beam to circulate enough times in the electron storage ring to come to equilibrium after cooling to the smaller equilibrium energy spread sufficient for FEL emission.

In some embodiments, operation of the storage ring FEL begins by the injection of electrons into the storage ring. In some embodiments, injector 1126 creates electron bunches below the energy of the storage ring. In this embodiment, the storage ring is ramped in energy after injection to the desired final energy. The operation of the EUV may be off from time to time for injecting the storage ring and reacceleration to the design storage ring energy.

In some embodiments, the storage ring may be injected with an electron beam with an energy that is equal to that desired for EUV operation. In this embodiment, the desired number of bunches may be injected and operation may be commenced thereafter. From time to time' additional electrons may be injected, avoiding the main beam and without disturbing the operation at EUV, for example after the intensity of the electron beam is reduced by several percent. This additional beam cools down to be absorbed into the primary circulating beam. This type of injection is sometimes referred as "top up" or trickle charge injection. The reduction in EUV power may be avoided by utilizing a corresponding increase in the seed power. This may be controlled by a feedback system in order to fulfill stability requirements for EUV output power.

The electrons circulate counter clockwise in storage ring 1100. Bending magnets have a dipole magnet field and may have additional quadrupole and sextupole fields. Additional magnets (not shown) include quadrupole (e.g., for focusing which keep the electron beam near a stable orbit that closes after one turn) and sextupole (e.g., used for correcting the chromaticity) magnets. The number of bending magnets 1102, 1104, 1106, and 1108, and the angular bend of each adds to a total bending of 360 degrees. The total number, position and strength of bending magnets, quadrupoles and RF cavities may be optimized to achieve the desired parameters of the ring including effects due to the emission of FEL radiation. The parameters may be optimized including 3D FEL effects so that, in particular, the emittance may not be less than $\lambda_{FEL}/4\pi$. The total number, position and strength of septums 1124 and kickers 1122 may be optimized to achieve the desired injection into the storage ring. The magnetic field may be selected for each magnet so as to create a stable configuration that permits an electron beam to circulate periodically in the steady state. In some embodiments, storage ring 1100 includes a sequence of magnets to disperse the electrons laterally according to their energy before entering an undulator.

Electrons which are stored in the storage ring radiate a significant amount of so called 'synchrotron radiation' which also serves to damp the electrons towards this closed stable orbit, which in turn cools the distribution of electrons by decreasing the electron beam emittance. In addition, because of this constant energy loss, RF cavity 1120 is provided with sufficient power to replace the energy lost due to synchrotron radiation. This continuous loss and acceleration also serves to damp the electron energy towards the stable periodic orbit, on which the amount of radiation is exactly canceled by the acceleration system. This results in the cooling, or decrease, of the relative energy spread of the beam. In addition to this cooling action, the electron beam is also heated by the emission of discrete photons. The FEL radiation emission may be the dominant heating mechanism in a storage ring based FEL. The competition between these effects yields Gaussian distributions in the transverse and longitudinal directions. Thus, electron storage ring 1100 may be used to optimize the 'emittance' of the beam in both the transverse degrees of freedom, as well as the longitudinal degree of freedom (relative energy spread and bunch length). Typical use of electron storage rings have been traditionally for the production of incoherent x-rays for research applications. However, such prior uses has not been optimized or considered for coherent FEL emission at EUV wavelength. Generally the prior designs based on traditional storage rings will not generate very high average power FEL EUV radiation.

The FEL in the storage ring may be operated in various alternative ways. In some embodiments, radiation is initiated by SASE (Self Amplified Stimulated Emission). In some embodiments, FEL is seeded with an external coherent source at 13.5 nm. In some embodiments, FEL is seeded with an external coherent source that has a multiple of the desired EUV wavelength. In some embodiments, FEL is self-seeded by selecting a small fraction of the output energy of one pulse and then using that energy to seed the next pulse (e.g., regenerative amplifier). The selected fraction of the output energy may be tuned to reach the desired output power, which is balance of the heating induced by the radiated power compared to the synchrotron radiation cooling.

In the embodiment shown in FIG. 11, self-seeding is used. The EUV output exiting output aperture 1130 includes incoherent undulator radiation and also SASE coherent radiation. A portion of the output of the EUV FEL itself is isolated and fed back into the undulator system 1200 to act as a seed (e.g., instead of using a separate seed system). Note that the seed pulse overlaps the electron beam. To seed the same bunch which created the seed, the total delay of the seed is equal to a multiple of the revolution time of the electron beam. Mirrors 1254 reflects a portion of the EUV FEL output and this reflected portion is reflected on mirrors 1256, 1258 and 1260 to be fed back into the storage ring. Multiple mirrors are utilized to increase the length of distance traveled by the reflected beam within a compact physical space. By adjusting the distance traveled by the reflected beam, the total time delay of the reflected beam is controlled. In order for the seed power to selectively seed the same bunch which created it, the total time delay of the mirrors to provide the EUV seed equals an integer multiple of the revolution time of the electron bunch. The mirrors shown in FIG. 11 are merely illustrative examples. In various embodiments, different number of mirrors, mirror geometries and/or other mirror configurations may be utilized. For example, an arc composed of a sequence of mirrors may turn the beam 180 degrees over multiple reflections at low angles of incidence. In other embodiments, a separate seed system or other mechanism might be used.

Undulator system 1200 functions in an analogous manner to systems 200, 300, 500, 600, 700 and 1000. Undulator system 1200 is adjusted in length so that it is long enough (e.g., several gain lengths) for SASE to develop in magnetic sections 1220. The length of undulator system 1200 is also adjusted with selection of electron bunch parameters such that the output power is below saturation. Progression along the undulator magnets 1220 causes density modulation at the wavelength of FEL emission. In some embodiments, undulator system 1200 is isochronous. Undulator system 1200 may be configured such that an input electron beam direction for the electron beam entering undulator system 1200 is within five degrees of an output electron beam direction for the electron beam exiting undulator system 1200.

Further, optical sections 1230 operate both on the electron beam and the radiation emitted by the electron beam. Optical sections 1230 focus and manipulate the electron beam density and the electron beam energy-dependent path length. Optical sections 1230 also match the radiation wavefront to the electron beam envelope (i.e. perform phase matching). In addition, optical sections 1230 can modify the path length of the radiation to match the electron beam delay. Thus, optical sections 1230 may operate as described with respect to FIGS. 2-10.

Using optical sections 1230, an electron beam and the corresponding radiation field (or beam) may be transversely focused within adjacent undulator magnets 1220. Thus, undulator system 1200 may increase the beam density and overlap during the FEL process. Further, undulator system 1200 can modify the electron beam energy-dependent path length to create a near isochronous condition for the electron beam between undulator magnets. Similarly, undulator system 1200 may adjust the overall path length of either or both the electron beam and radiation field to provide temporal overlap between them when entering the next undulator section. Consequently, FEL 1100 may provide FEL radiation for a large energy spread of the electron beam. For example, an equilibrium relative energy spread of the electron beam may be not less than a FEL Pierce parameter (e.g. on the order of the Pierce parameter or larger), but the FEL radiation may still be generated using undulator system 1200.

Figure 12:
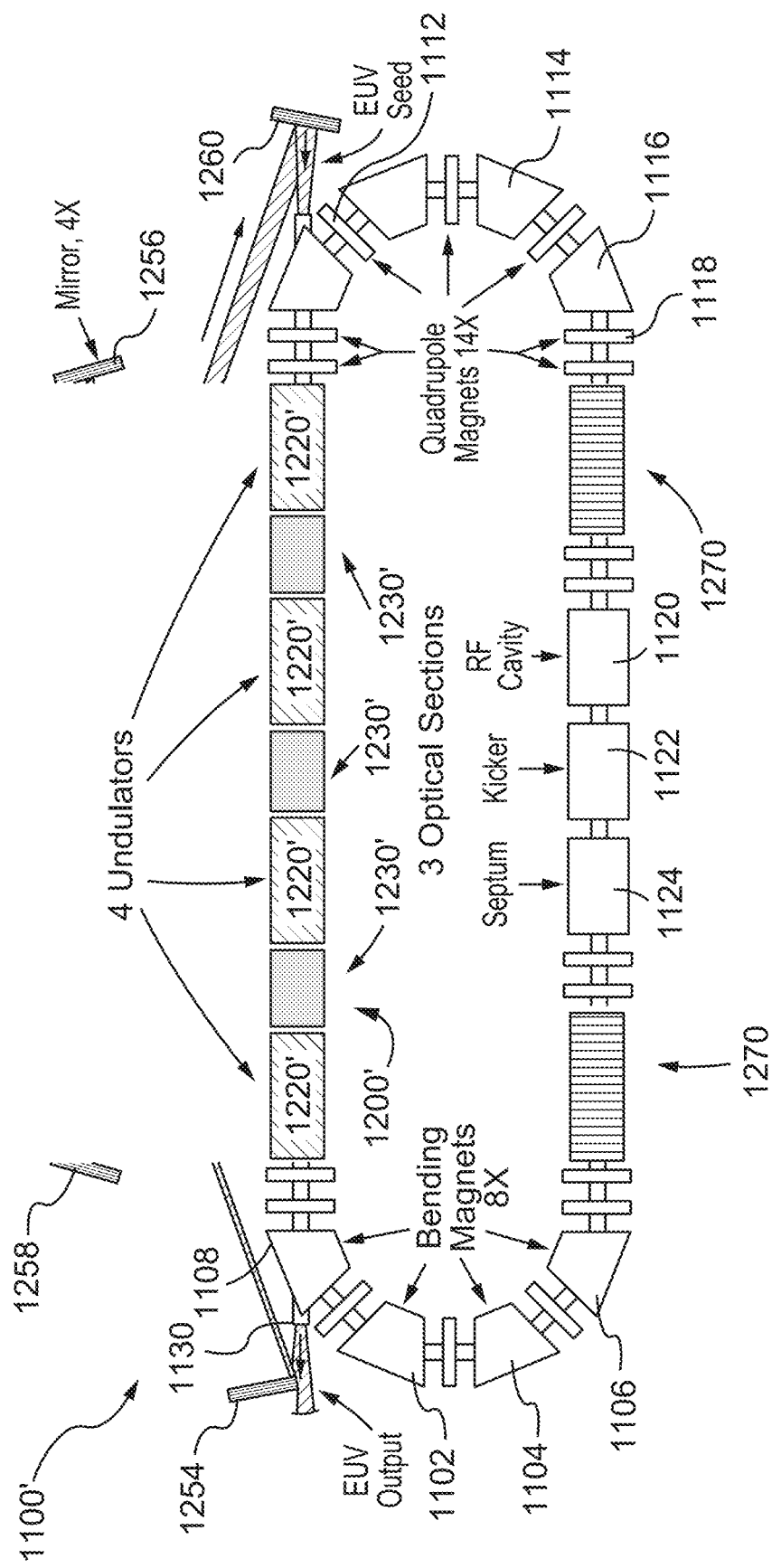
FIG. 12 depicts an embodiment of an FEL including an undulator having optical sections and magnetic undulator sections.

FIG. 12 depicts an embodiment of an FEL 1100' including an undulator having optical sections and undulator magnets. FEL 1100' is analogous to FEL 1100. Thus, analogous components have similar labels. For clarity, not all components are labeled in FIG. 12 and portions of the self-seeding apparatus are not shown.

FEL 1100' also includes undulator system 1200'. Undulator system 1200' is analogous to undulator system 1200, but includes four undulator magnets 1220' and three optical sections 1220'. Undulator system 1200' functions in an analogous manner to undulator system 1200. However, as can be seen in FIG. 12, FEL 1100' may have longer sections to accommodate undulator system 1200'. Also shown are damping wigglers 1270 that may be used to allow more radiated power extraction, increasing the cooling rate and therefore allowing more radiated power from the FEL (i.e. heating term is proportional to the generated power)

Undulator system 1200' shares the benefits of undulator system 1200. Thus, FEL 1100' may provide FEL radiation for a large energy spread of the electron beam. For example, an equilibrium relative energy spread of the electron beam may be not less than a FEL Pierce parameter (e.g. on the order of the Pierce parameter or larger), but the FEL radiation may still be generated using undulator system 1200'.

Figure 13:
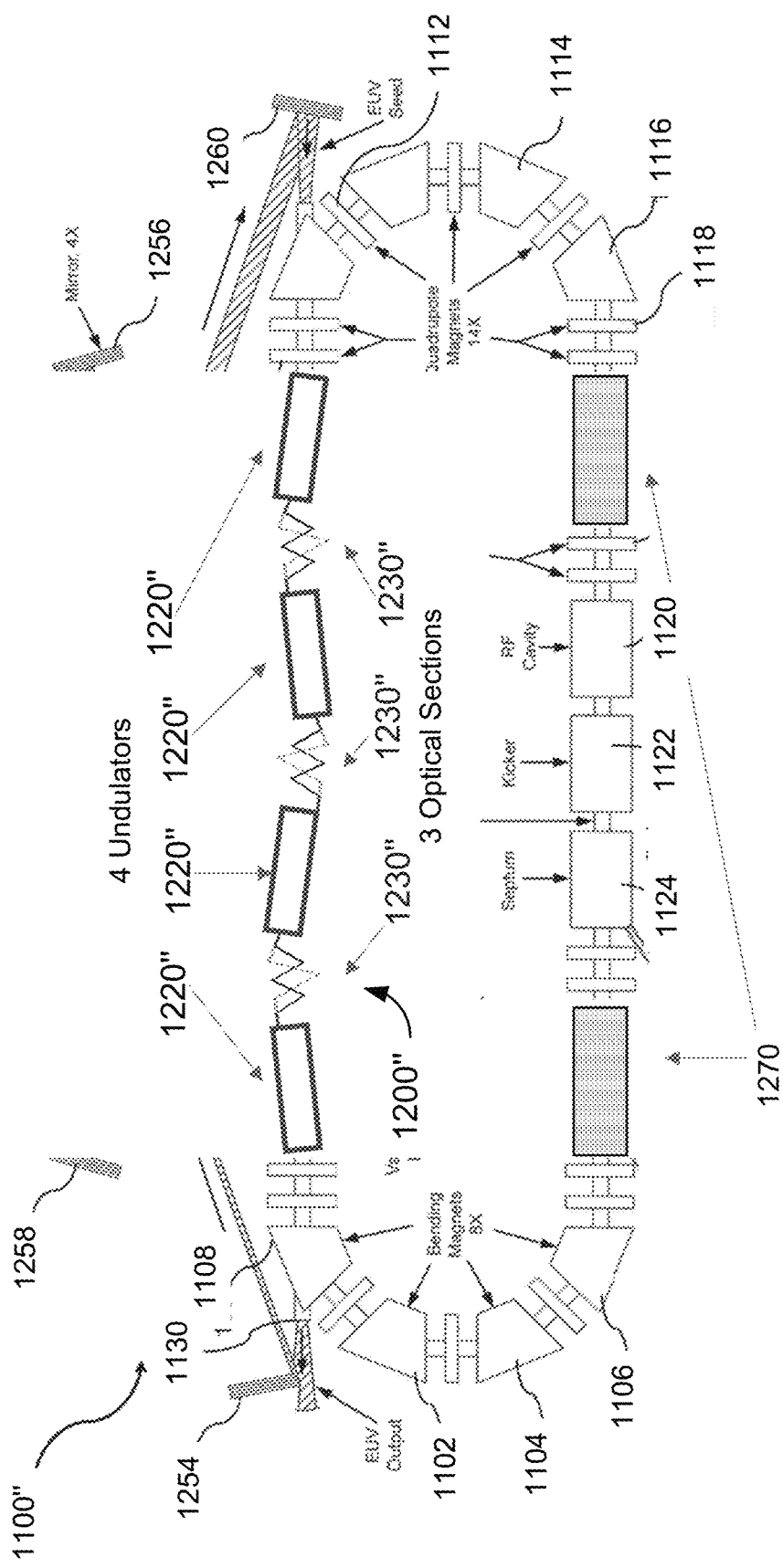
FIG. 13 depicts an embodiment of an FEL including an undulator having optical sections and magnetic undulator sections.

FIG. 13 depicts an embodiment of an FEL 1100" including an undulator having optical sections and magnetic undulator sections. FEL 1100" is analogous to FEL(s) 1100 and/or 1100'. Thus, analogous components have similar labels. For clarity, not all components are labeled in FIG. 13 and portions of the self-seeding apparatus are not shown.

FEL 1100" also includes undulator system 1200". Undulator system 1200" is analogous to undulator system 1200, but includes four undulator magnets 1220" and three optical sections 1220". Undulator system 1200" functions in an analogous manner to undulator system 1200. However, as can be seen in FIG. 13, undulator 1200' has been depicted to more accurately indicate the electron beam path and orientation of undulator magnets 1230" and optical sections 1220".

Undulator system 1200" shares the benefits of undulator systems 1200 and/or 1200'. Thus, FEL 1100" may provide FEL radiation for a large energy spread of the electron beam. For example, an equilibrium relative energy spread of the electron beam may be not less than a FEL Pierce parameter (e.g. on the order of the Pierce parameter or larger), but the FEL radiation may still be generated using undulator system 1200".

Figure 14:
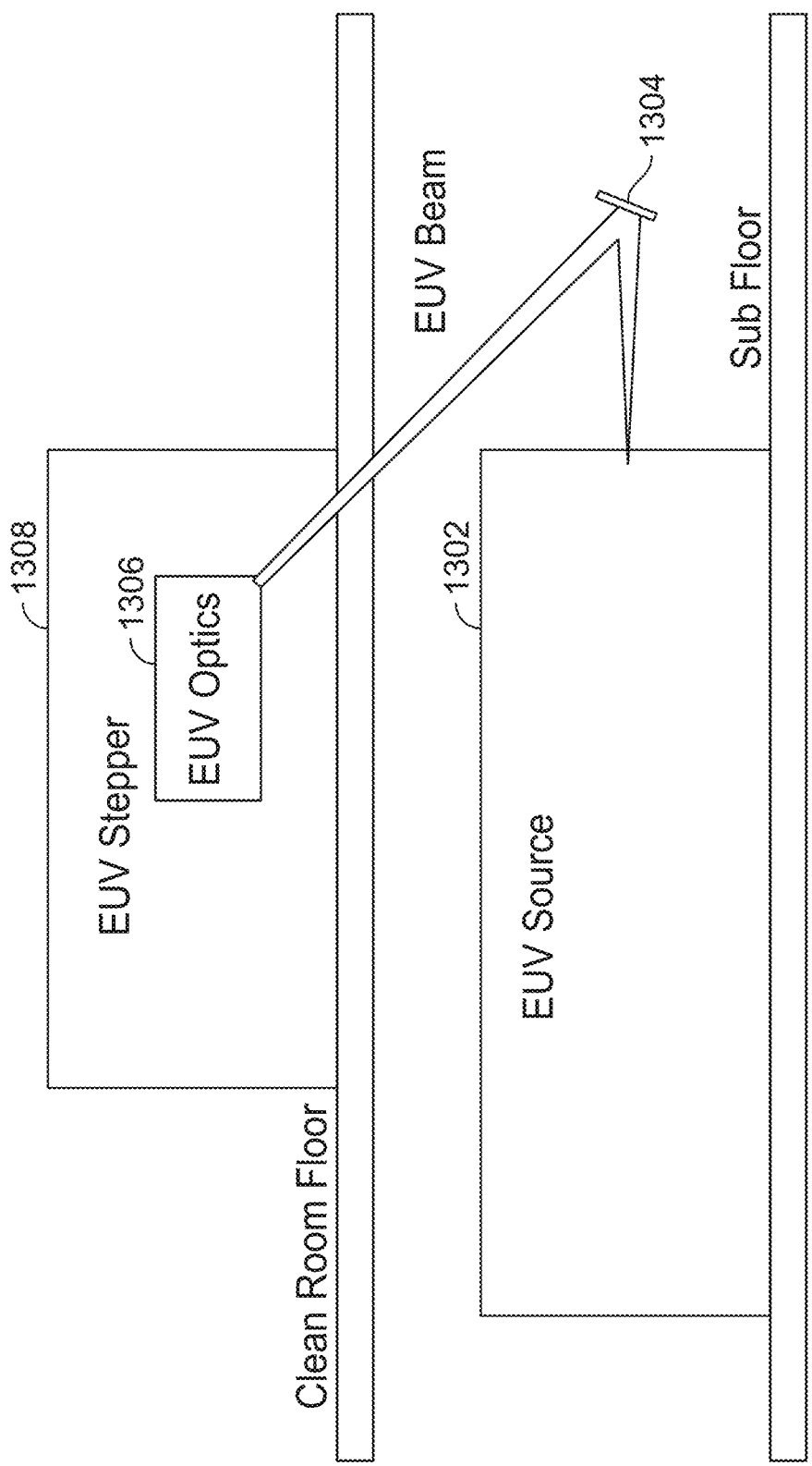
FIG. 14 depicts a system for performing EUV lithography.

FIG. 14 is a block diagram illustrating an embodiment of a system for performing EUV lithography. EUV source 1402 has been installed on a subfloor under a floor of a semiconductor manufacturing facility clean room. The compact size EUV source 1402 enabled by the use of a compact storage ring (e.g., compact storage ring 1100 of FIG. 11) has allowed EUV source 1402 to be small enough to fit within a typically sized semiconductor manufacturing facility. Examples of EUV source included in EUV source 1402 include systems 1100, 1100' and/or 1100". Such sources include undulator systems such as undulator systems 1200, 1200' and/or 1200' employing systems such as system(s) 200, 300, 500, 600, 700, and/or 1000. The EUV beam output generated by EUV source 1402 is reflected by mirror 1404 up to EUV optics 1406 of EUV lithography system/stepper 1408 (e.g., lithography scanner) for use as the light source of EUV lithography. In some embodiments, the same beam output generated by EUV source 1402 is provided a plurality of lithography steppers/scanners.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
an electron beam source configured to provide an electron beam; and
at least one undulator system configured to produce free-electron laser (FEL) radiation, the at least one undulator system including a plurality of undulators and at least one optical section between the plurality of undulators, the plurality of undulators configured to induce the electron beam to microbunch and radiate coherently, the at least one optical section configured to operate on the electron beam and the FEL radiation provided by the electron beam, the at least one undulator system configured such that an input electron beam direction for the electron beam entering the at least one undulator system is within five degrees of an output electron beam direction for the electron beam exiting the at least one undulator system.

2. The system of claim 1, wherein the at least one optical section is further configured to steer and focus the FEL radiation.

3. The system of claim 2, wherein the at least one optical section is configured to focus the FEL radiation to phase match the FEL radiation with an electron beam envelope and to modify a FEL radiation path length through the at least one undulator system, thereby tuning a relative radiation path length difference to that of the electron beam path.

4. The system of claim 1, wherein the at least one optical section is further configured to modify an electron beam density and adjust an electron energy-dependent beam path length through the at least one undulator system.

5. The system of claim 1, wherein each of the at least one optical section further includes:
at least one minor configured to focus the FEL radiation and modify a FEL radiation path length through the optical section; and
at least one magnetic bending component configured to focus the electron beam and modify an electron beam energy-dependent path length through the optical section.

6. The system of claim 5, wherein the at least one magnetic bending component is positioned to deflect the electron beam from at least one location for the at least one minor.

7. The system of claim 1, wherein an equilibrium relative energy spread of the electron beam is not less than a free election laser ρ parameter of the system.

8. The system of claim 1, further comprising:
an electron storage ring configured for emission of the FEL radiation, the at least one undulator system being incorporated in the electron storage ring; and
wherein the electron beam source includes an electron injector configured to insert the electron beam into the electron storage ring.

9. The system of claim 1, wherein the at least one undulator system is an isochronous undulator system for the electron beam.

10. The system of claim 1, further comprising:
an exit aperture configured to output a portion of the FEL radiation at an extreme ultraviolet wavelength range produced by an interaction of the electron beam through the at least one undulator system.

11. A method, comprising:
injecting an electron beam into a storage system; and
passing the electron beam through at least one undulator system configured to produce free-electron laser (FEL) radiation, the at least one undulator system including a plurality of undulators and at least one optical section between the plurality of undulators, the plurality of undulators inducing the electron beam to microbunch and radiate coherently, the at least one optical section operating on the electron beam and FEL radiation provided by the electron beam, the at least one undulator system being an isochronous undulator system for the electron beam.

12. The method of claim 11, wherein the passing the electron beam through the at least one undulator system further includes:
using the at least one optical section to focus the FEL radiation to phase match the FEL radiation with an electron beam envelope and modify a FEL radiation path length through the at least one undulator system, thereby tuning a relative radiation path length difference to that of the electron beam path.

13. The method of claim 11, wherein the using the at least one optical section further includes:
modifying an electron beam density and adjusting an electron beam energy-dependent path length through the at least one undulator system using the at least one optical section.

14. The method of claim 11, wherein the passing the electron beam through the at least one undulator system further includes:
directing the electron beam through a path such that the FEL radiation traverses at least one mirror and such that the electron beam traverses at least one magnetic bending component, the at least one mirror being configured to focus the FEL radiation and modify a FEL radiation path length through the optical section and the at least one magnetic bending component being configured to focus the electron beam and modify an electron beam energy-dependent path length through the optical section.

15. The method of claim 11, wherein an equilibrium relative energy spread of the electron beam is not less than a free election laser ρ parameter of the electron beam.

16. The method of claim 11, wherein the passing the electron beam through the at least one undulator system further includes:
directing the electron beam through the at least one undulator system such that an input electron beam direction for the electron beam entering the at least one undulator system is within five degrees of an output electron beam direction for the electron beam exiting the at least one undulator system.

17. The method of claim 11, further comprising:
outputting a portion of the FEL radiation through an exit aperture at an extreme ultraviolet wavelength range produced by an interaction of the electron beam through the at least one undulator system.

* * * * *